US006431414B2

(12) United States Patent
Jaleel et al.

(10) Patent No.: US 6,431,414 B2
(45) Date of Patent: Aug. 13, 2002

(54) FLEXIBLY ORIENTED ICE DISPENSER

(75) Inventors: Ehab Jaleel, Atlanta, GA (US); Thaddeus M. Jablonski, Palatine, IL (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/814,978

(22) Filed: Mar. 22, 2001

Related U.S. Application Data

(62) Division of application No. 09/536,593, filed on Mar. 28, 2000.

(51) Int. Cl.[7] ................................................ G01F 11/20

(52) U.S. Cl. .................................... 222/413; 222/146.6

(58) Field of Search ............................. 222/413, 146.6, 222/412

(56) References Cited

U.S. PATENT DOCUMENTS 3,211,338 A * 10/1965 Weil et al. ............... 222/146.1
3,580,428 A * 5/1971 Garber ....................... 222/413
3,608,786 A * 9/1971 Shelley et al. .............. 222/232
3,610,482 A * 10/1971 Steenburgh, Jr. ............ 222/403
3,715,119 A * 2/1973 Shelley et al. .............. 222/413
3,913,343 A * 10/1975 Rowland et al. ............ 222/241
4,732,301 A * 3/1988 Tobias et al. ............... 222/203
4,856,682 A 8/1989 Miller et al. ................ 222/238
4,946,073 A 8/1990 Brill et al. ............... 222/129.4
5,058,773 A * 10/1991 Brill et al. .................. 222/133
5,074,341 A 12/1991 Credle, Jr. et al. .............. 141/1
5,267,672 A * 12/1993 Jacobsen et al. ............ 222/159
5,299,427 A 4/1994 Miller et al. ................... 62/66
5,542,573 A * 8/1996 Frantz ..................... 222/146.6
5,660,307 A 8/1997 Schroeder et al. .......... 222/108
5,829,646 A 11/1998 Schroeder et al. .......... 222/241
RE36,324 E * 10/1999 Yoda et al. ................. 222/325
6,039,220 A * 3/2000 Jablonski et al. ........... 222/413

FOREIGN PATENT DOCUMENTS

GB 2 198 713 6/1988
WO WO 96/09981 4/1996

* cited by examiner

*Primary Examiner*—William Doerrler
*Assistant Examiner*—Stephanie Willatt
(74) *Attorney, Agent, or Firm*—Sutherland Asbill & Brennan LLP

(57) ABSTRACT

A beverage dispenser system having a beverage tower with a first side and a second side. The beverage dispenser system also has an ice elevator and an ice hopper connected to the ice elevator. The ice hopper has a first side exit and a second side exit such that the ice elevator may be positioned on either side of the beverage tower and connected to either side exit of the ice hopper.

16 Claims, 4 Drawing Sheets

FLEXIBLY ORIENTED ICE DISPENSER

This is a divisional application of Ser. No. 09/536,593, filed Mar. 28, 2000, now allowed.

TECHNICAL FIELD

The present invention relates generally to a beverage dispenser and more particularly relates to a beverage dispenser with an ice hopper and an ice elevator that can accommodate multiple ice-dispensing orientations.

BACKGROUND OF THE INVENTION

Countertop beverage dispensers typically use an ice receptacle of some sort for both chilling the beverage fluids flowing therein and providing ice cubes for use in the beverage. For example, an ice hopper containing the ice cubes generally is positioned adjacent to a cold plate or other type of heat transport mechanism so as to chill the concentrate and the diluent flowing therethrough. Because the ice hopper generally is placed beneath the countertop, an elevator mechanism may be used to transport the ice cubes from the ice hopper up to an ice dispenser positioned above the countertop. This elevator mechanism generally uses an ice auger positioned within an elevator sleeve. As the auger rotates within the sleeve, the ice cubes are carried from the bin to the ice dispenser.

The ice hopper generally is pre-configured before installation for use with either a left-sided ice dispenser or a right-side dispenser. By pre-configured, we mean that the ice hopper is intended for use with an ice elevator positioned on one side of the beverage dispenser or the other. As a result, the ice hopper generally is angled toward one side or the other and generally has an agitator therein that tends to force the ice cubes towards that side. As such, a left-handed ice hopper generally cannot be used in right-handed orientation and vice versa. This set up is inconvenient in that the ice hopper manufacture must maintain a supply of left and right handed ice hoppers. Likewise, the installer must order the correct orientation before installation. Further, any change in the design or flow of the ice dispenser or the beverage system as a whole generally cannot be accommodated with the existing ice hopper.

Similarly, existing ice elevators generally are fixed into position at the time of installation. Access to or removal of a single component within the ice elevator may be difficult. As such, cleaning or repair of the ice elevator also may be difficult or time consuming.

What is needed, therefore, is a beverage system with a flexibly oriented ice hopper. The ice hopper should be able to accommodate either left or right handed orientations without undue modifications or down time. Further, the beverage dispenser as a whole, including the ice elevator, should be easy to access, easy to clean, and easy to repair. The beverage dispenser should accomplish these goals in a cost effective and easy to operate manner.

SUMMARY OF THE INVENTION

The present invention thus provides a beverage dispenser system having a beverage tower with a first side and a second side. The beverage dispenser system also has an ice elevator and an ice hopper connected to the ice elevator. The ice hopper has a first side exit and a second side exit such that the ice elevator may be positioned on either side of the beverage tower and connected to either side exit of the ice hopper.

Specific embodiments of the present invention include a sub-base such that the ice hopper is position below the sub-base and the beverage tower is positioned above the sub-base. The ice hopper may include an agitator with a number of agitator arms. The ice hopper may have a single bin or a number of bins. Each bin may have an agitator therein. The ice hopper may be made out of a rigid plastic.

The ice elevator may include an ice auger and an ice tower. The ice tower may be made out of a transparent material. The ice tower may include a lower auger housing made out of a PVC. The ice tower also may include an auger sleeve. The auger sleeve may have an inner sleeve, an outer sleeve, and an air space positioned therebetween. The auger sleeve may be made out of a thermoplastic. The ice tower also may include an outer housing surrounding the auger sleeve. A second air space may be positioned between the outer housing and the auger sleeve. The outer sleeve may be made out of a rigid plastic. The outer housing also may have a sliding auger sleeve so as to permit access to the auger sleeve. A conduit may connect the ice hopper and the ice tower.

The ice elevator also may include an ice dispenser position on the ice tower. The ice dispenser may have an ice shoot and an ice dispenser lever so as to activate the ice elevator. The ice dispenser may be made out of a rigid plastic or a transparent material. An ice dispenser sleeve may connect the ice elevator and the ice dispenser. The ice dispenser may have a number of bosses thereon that mesh with a number of slots on the ice dispenser sleeve so as to secure the ice dispenser.

The present invention also provides an ice hopper for use with a beverage dispenser system having a beverage tower and an ice elevator. The ice hopper may have an agitator, a first side exit, and a second side exit, such that the ice elevator may be connected to the ice hopper by either the first side exit or the second side exit.

The present invention also provides an ice elevator for use with a beverage dispenser system. The ice elevator may have an ice auger, an ice tower surrounding the ice auger, and an ice dispenser positioned on top of the ice tower. The ice tower may have an inner sleeve and an outer sleeve. The ice tower may have an air space positioned between the inner sleeve and the outer sleeve. The ice tower also may include an outer housing surrounding the outer sleeve. A second air space may be positioned between the outer sleeve and the outer housing. The outer housing may have a sliding auger sleeve so as to permit access to the outer sleeve. The ice dispenser also may have an ice shoot and an ice dispenser lever so as to activate the ice elevator. The ice tower and the ice dispenser may be made out of a transparent material. An ice dispenser sleeve may connect the ice tower and the ice dispenser. The ice dispenser may have a number of bosses thereon that mesh with a number of slots on the ice dispenser sleeve so as to secure the ice dispenser.

Other objects, features, and advantages of the present invention will become apparent upon review of the following detailed description of the invention when taken in conjunction with the drawings and the appended claims.

DETAILED DESCRIPTION OF THE INVENTION

Figure 1:
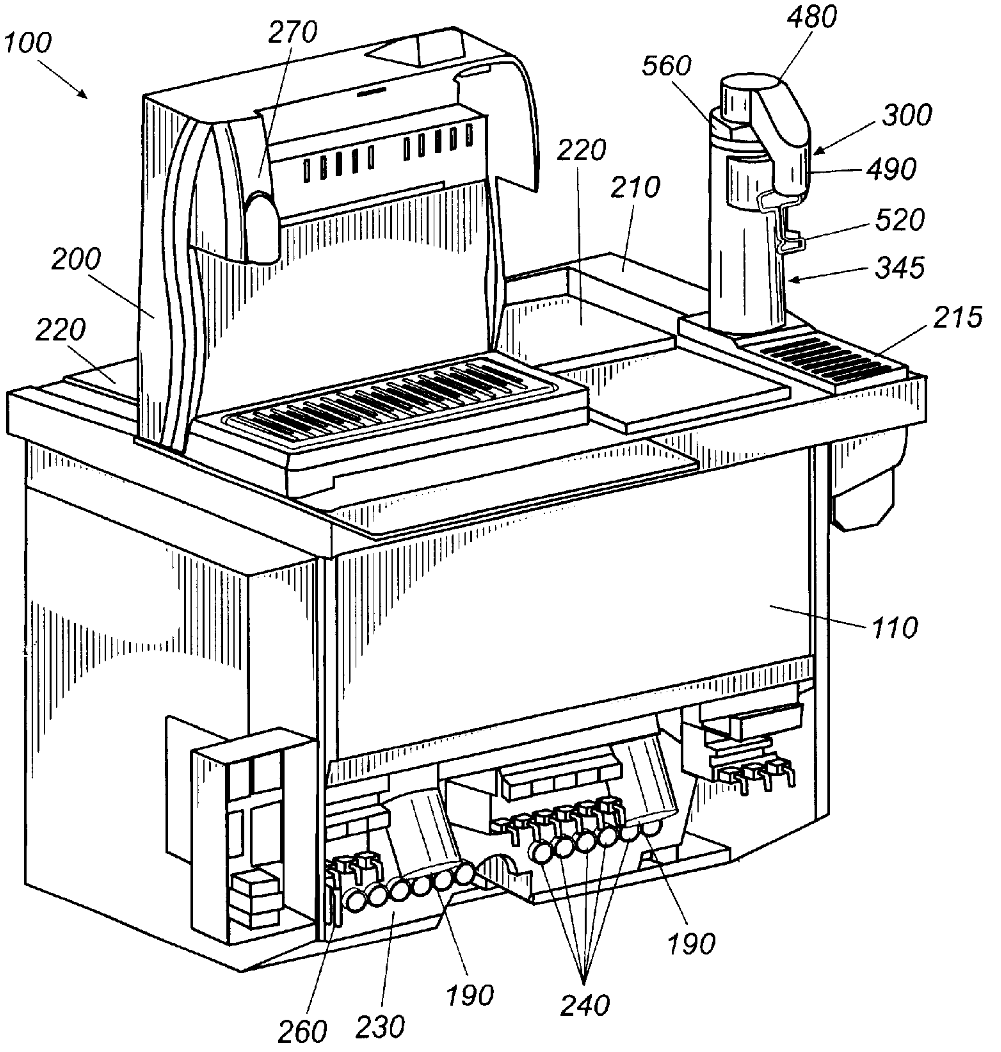
FIG. 1 is a perspective view of the beverage dispenser system of the present invention.
Figure 3:
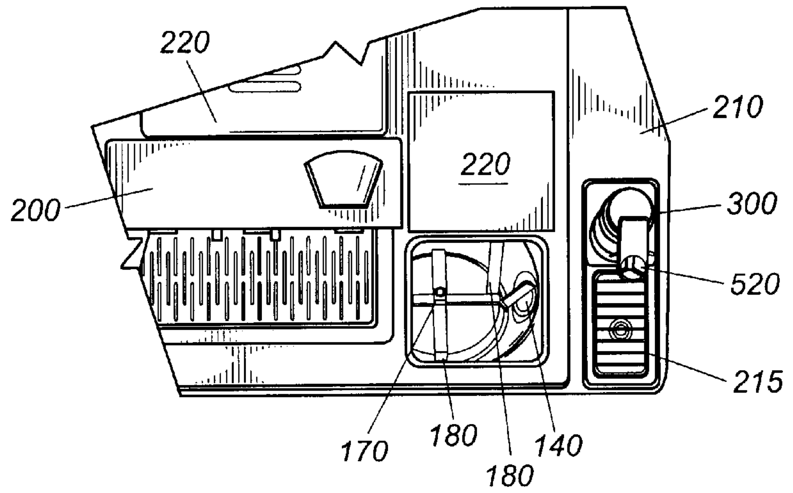
FIG. 3 is a top perspective view showing the sub-base, the beverage tower, the ice hopper with the agitator, and the ice elevator.

Referring now to the drawings, in which like numerals refer to like elements throughout the several views, FIGS. 1–6 show a beverage dispenser system 100 of the present invention. The beverage dispenser system 100 may include an ice hopper 110. The ice hopper 110 may be a conventional tub-shaped structure. The ice hopper 110 may have a first bin 120 and a second bin 130 as shown, or a single bin may be used. In fact, any number of bins 120, 130 may be used. The hopper 110 may have a number of apertures 140 positioned therein. Specifically, the ice hopper 110 preferably has a first side exit 150 and a second side exit 160. The ice hopper 110 also may have a drainage aperture (not shown) positioned therein. The ice hopper 110 may be made from conventional materials, including a rigid plastic such as ABS (acrylonitrile-butadiene-styrene), stainless steel, or any other substantially noncorrosive material. It is important to note that all of the materials used herein that may touch the ice cubes must be made out of food grade material as is well known to those skilled in the art. Further, the ice hopper 110 may be insulated in a conventional fashion.

Positioned within the ice hopper 110 may be an agitator 170. Generally described, the agitator 170 is a rotating device with a plurality of agitator arms 180. The agitator 170 rotates within the ice hopper 110 so as to prevent the ice therein from solidifying together and also to move the ice towards and into the first-side exit 150 or the second-side exit 160. One agitator 170 may be positioned within the first bin 120 and one agitator 170 may be positioned within the second bin 130. The agitator 170 in bin 120 and the agitator 170 in bin 130 may rotate in opposite directions.

The agitator 170 may be operated by an agitator motor 190. The agitator motor 190 may be positioned within or adjacent to the ice hopper 110. The agitator motor 190 may be a conventional AC motor. For example, an 11.5 volt permanent split capacitor AC motor may be used. The size and speed of the agitator motor 190 will depend upon the size and volume of the beverage dispenser 100 as a whole. The agitator motor 190 may operate the agitator 170 continuously, at predetermined intervals, or based upon other types of controls.

The ice hopper 110 may be mounted below the counter-top level. The ice hopper 110 may be used in connection with a beverage tower 200. The beverage tower 200 may be of conventional design. The beverage tower 200 mixes the incoming concentrate and diluent streams so as to provide a beverage to the customer as is well known in the art. The ice hopper 110 may be positioned beneath the counter or a sub-base 210 with the beverage tower 200 positioned on top of the sub-base 210. The sub-base 210 may have one or more lids 220 such that ice cubes may be poured into the ice hopper 110. Alternatively, a conventional ice-making machine (not shown) may be positioned adjacent to the ice hopper 110. The ice-making machine may freeze a predetermined amount of ice in a predetermined configuration as is well known in the art so as to keep the ice hopper 110 full. The sub-base 210 also may include a drip tray 215 and other elements generally used with the beverage dispenser system 100.

The beverage dispenser system 100 generally also includes a cold plate 230 positioned adjacent to and in thermal communication with the ice hopper 110. The cold plate 230 may be of conventional design. The cold plate 230 generally includes a plurality of fluid sleeves 240 and water conduits 250 therein so as to chill the fluids used within the beverage tower 200. These sleeves 240 and the conduits 250 may accommodate either concentrate, such as beverage syrup, or diluent, such as carbonated water, plain water, and the like. The sleeves 240 and the water conduits 250 are connected to the beverage tower 200 via a plurality of fluid risers 260. The concentrate and the diluent are then mixed within the beverage tower 200 and dispensed through a spout 270. The beverage dispenser system 100 may be activated by a lever, a button, or by other types of conventional means.

Figure 2:
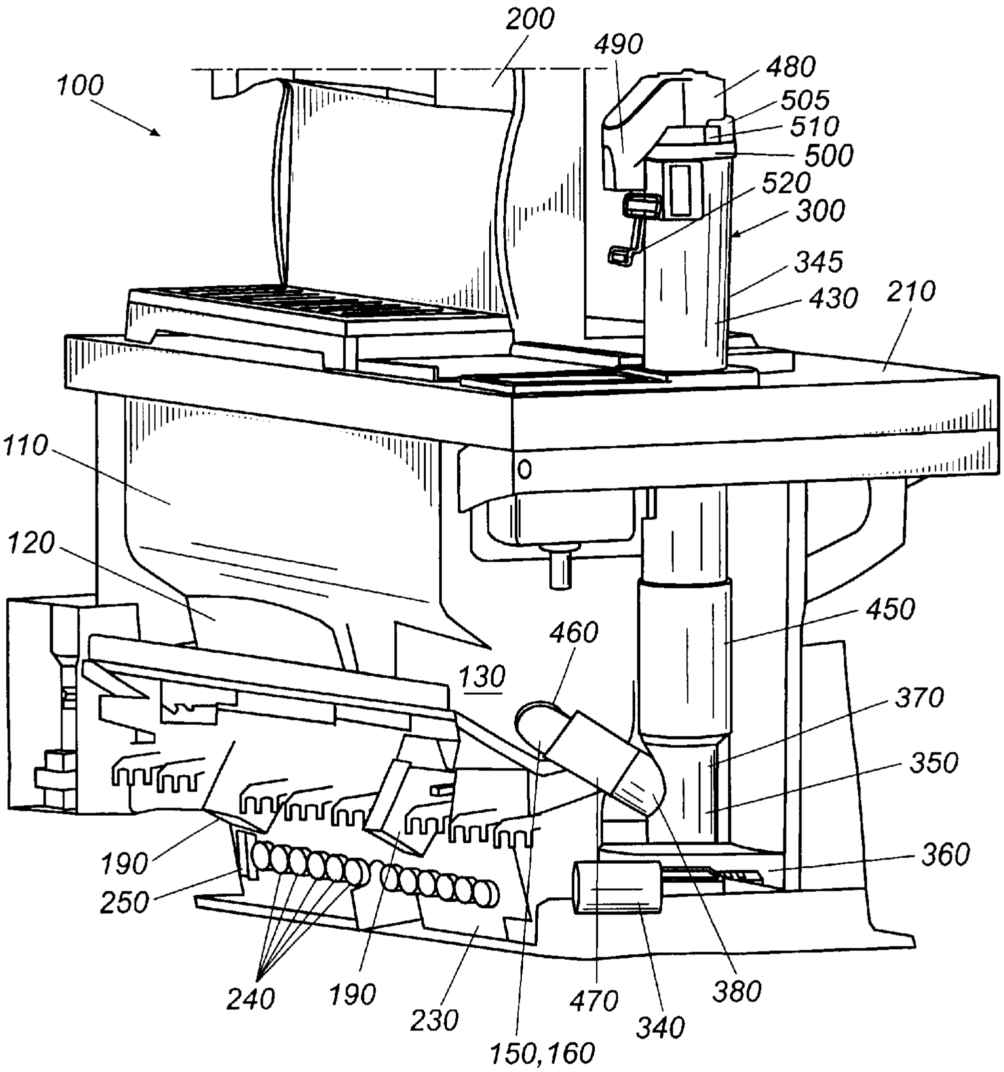
FIG. 2 is a perspective view of the beverage dispenser system of the present invention showing the ice hopper, the ice elevator, and the cold plate.
Figure 6:
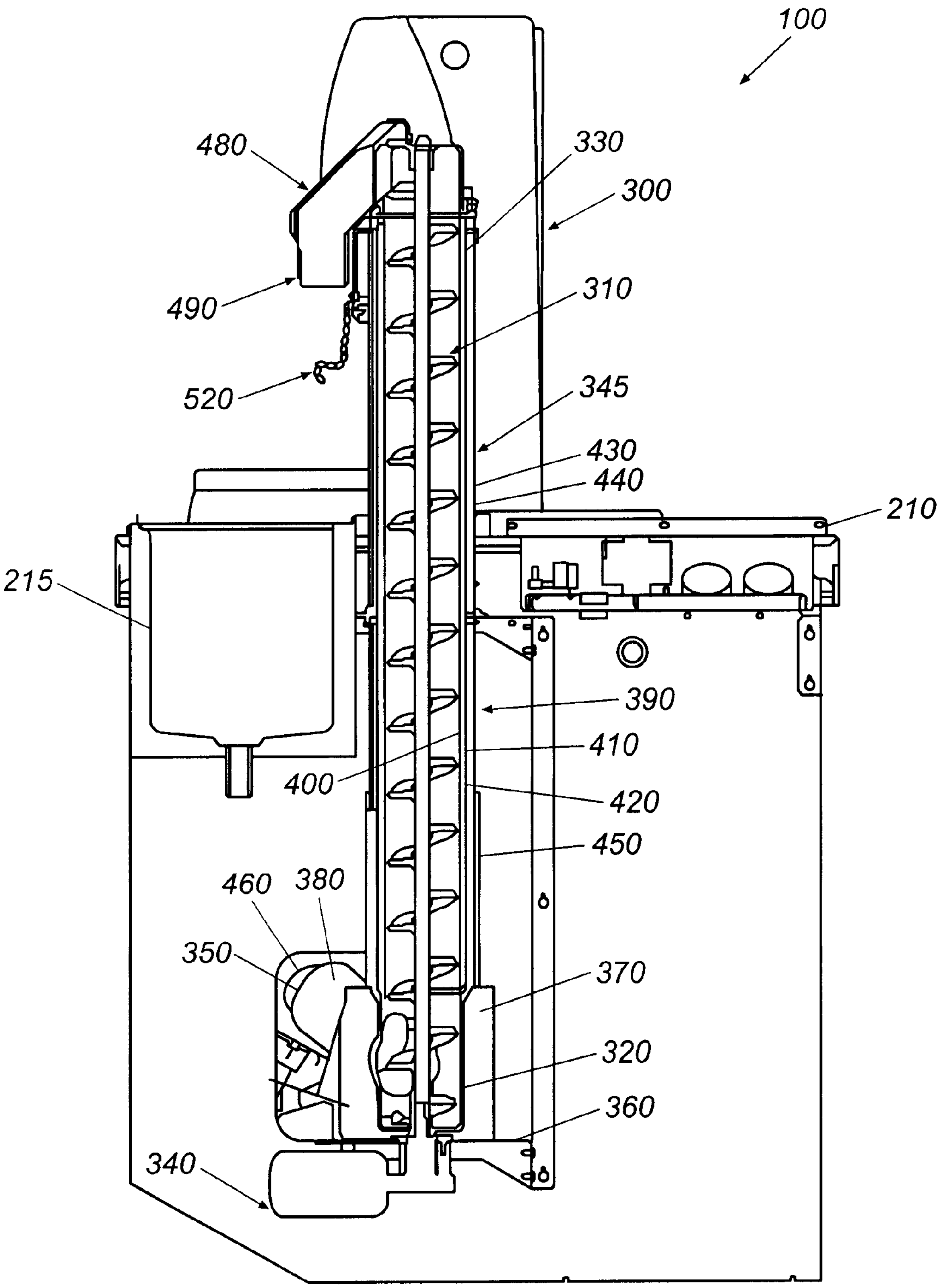
FIG. 6 is a side cross-sectional view of the ice elevator.

As is best shown in FIGS. 2 and 6, an ice elevator 300 may be positioned on either side of the ice hopper 110 and the beverage tower 200. The ice elevator 300 generally may include an ice auger 310 for transporting the ice cubes. The ice auger 310 may be of a conventional screw-type design. The size of the auger 310 will depend upon the size and volume of the beverage dispenser 100 as a whole. A preferred ice auger 310 may be similar to that described in commonly owned U.S. patent application Ser. No. 09/263,135, entitled “Mechanical Auger For Ice Handling Applications”. U.S. patent application Ser. No. 09/263,135 is incorporated herein by reference. The auger 310 preferably has a lower first end 320 and an upper second end 330.

The ice auger 310 may be operated by an auger motor 340. The auger motor 340 may be positioned within or adjacent to the ice hopper 110. The auger motor 340 drives the auger 310 via its lower first end 320. The auger motor 340 may be a conventional electrical motor. For example, the auger motor 340 may be a conventional 25-volt DC motor with speed control. The size and speed of the auger motor 340 will depend upon the size and volume of the beverage dispenser 100 as a whole.

The auger 310 may be positioned within an ice tower 345. The ice tower 345 preferably is a multi-element structure, but the ice tower 345 also may be molded as a unitary element. The ice tower 345 preferably includes a lower auger housing 350. The lower auger housing 350 is fixedly attached to a base 360. The lower auger housing 350 is a substantially tubular-shaped element with a main auger tube 370 and a connecting supply tube 380. The lower first end 320 of the ice auger 310 is mounted within the main auger tube 370. Ice cubes from the ice hopper 110 flow through the supply tube 380 to the ice auger 310 within the main auger tube 370. The lower auger housing 350 is preferably made from a rigid plastic such as PVC (polyvinyl chloride). Other possible materials include stainless steel or other types of substantially non-corrosive materials.

Positioned on top of the lower auger housing 350 is an auger sleeve 390. The auger sleeve 390 surrounds the ice auger 310 and has a diameter slightly larger than the ice auger 310. The auger sleeve 390 preferably is a two piece structure with an inner sleeve 400 and an outer sleeve 410. Positioned between the sleeves 400, 410 preferably is an air space 420. The air space 420 provides insulation to the auger sleeve 390. Alternatively, the auger sleeve 390 may be a single injected element with the air space 420 formed therein. The auger sleeve 390 preferably is made from a thermoplastic such as polypropylene or similar materials.

Positioned about the auger sleeve 390 may be an outer housing 430. The outer housing 430 is separated from the auger sleeve 390 by a second air space 440. The second air space 440 also provides insulation to the auger sleeve 390. The outer housing 430 may be made from a rigid plastic such as PVC, ABS, or similar materials. Condensation formed by the ice within the auger sleeve 390 should form about the outer housing 430 and flow towards the drip tray 215.

Positioned at the bottom of the auger sleeve 390 is a sliding auger sleeve 450. The sliding auger sleeve 450 may be raised about the outer housing 430 so as to provide access to the auger sleeve 390 and the lower auger housing 350. The auger sleeve 390 may have a cutout portion positioned adjacent to the sliding auger sleeve 450 so as to permit direct access to the auger 310. The sliding auger sleeve 450 may be made from a thermoplastic such as polypropylene or similar materials.

The ice tower 345 is connected to one of the side exits 150, 160 of the ice hopper 110. As is shown in FIGS. 2 and 6, the side exits 150, 160 include a spigot 460. The spigot 460 of the ice hopper 110 is connected to the lower auger housing 350 of the tower 345 via a conduit 470. The conduit 470 is a tubular shaped element that may be made from a rigid plastic such as polycarbonate, ABS, or similar materials. A preferred polycarbonate resin is manufactured by General Electric Corporation under the trademark "Lexan". The conduit 470 may be attached by a setscrew (not shown) or similar attachment means such that the conduit 470 may be removed for cleaning or for providing access to the lower auger housing 350.

The top end of the ice tower 345 may include an ice dispenser 480. The ice dispenser 480 may be of conventional design and may include an ice chute 490. The ice chute 490 may be in the form of a downward facing spout such that ice cubes progressing through the ice elevator 300 may be dispensed into a consumer's cup. The ice dispenser 480 may be made of a rigid plastic such as Lexan or similar materials. Further, the ice dispenser 480 and the elements that make up the ice tower 345, particularly the auger sleeve 390 and the outer housing 430, may be made out of a colored or a clear material. The use of a clear material allows a consumer to see the ice as it is elevated through the ice elevator 300.

Figure 7:
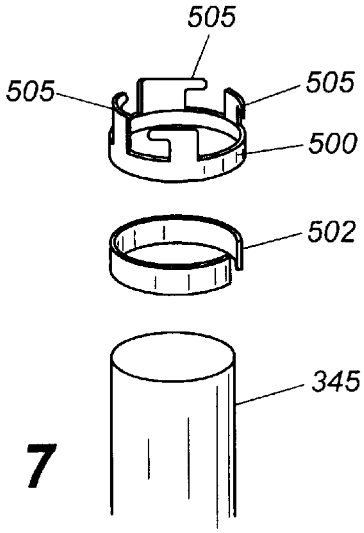
FIG. 7 is a perspective view of the ice dispenser sleeve and the ice dispenser.
Figure 4:
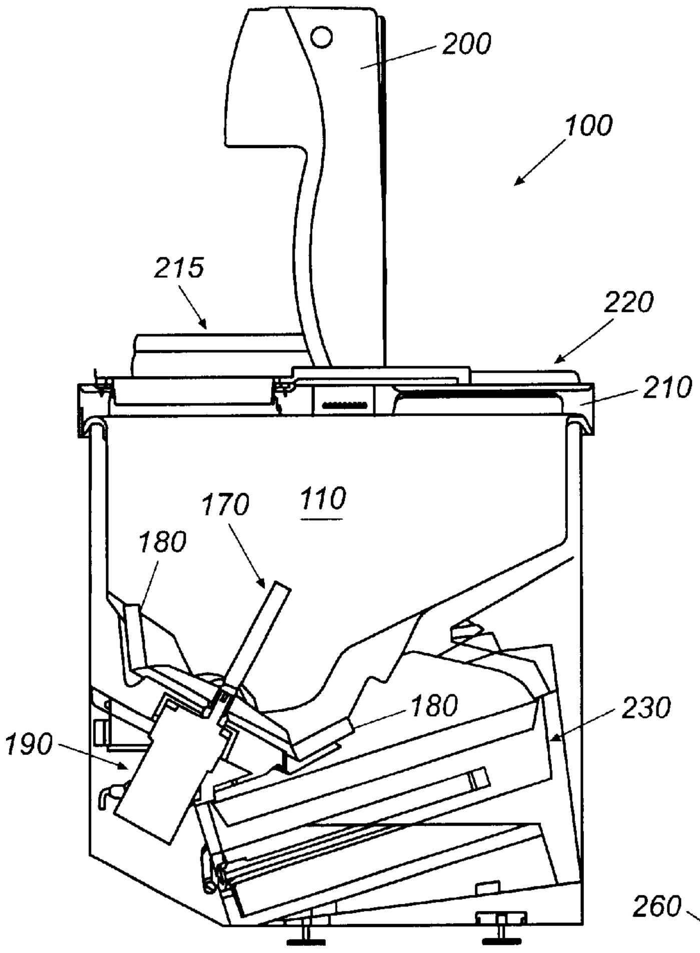
FIG. 4 is a side cross-sectional view of the ice hopper, the agitator, and the cold plate.
Figure 5:
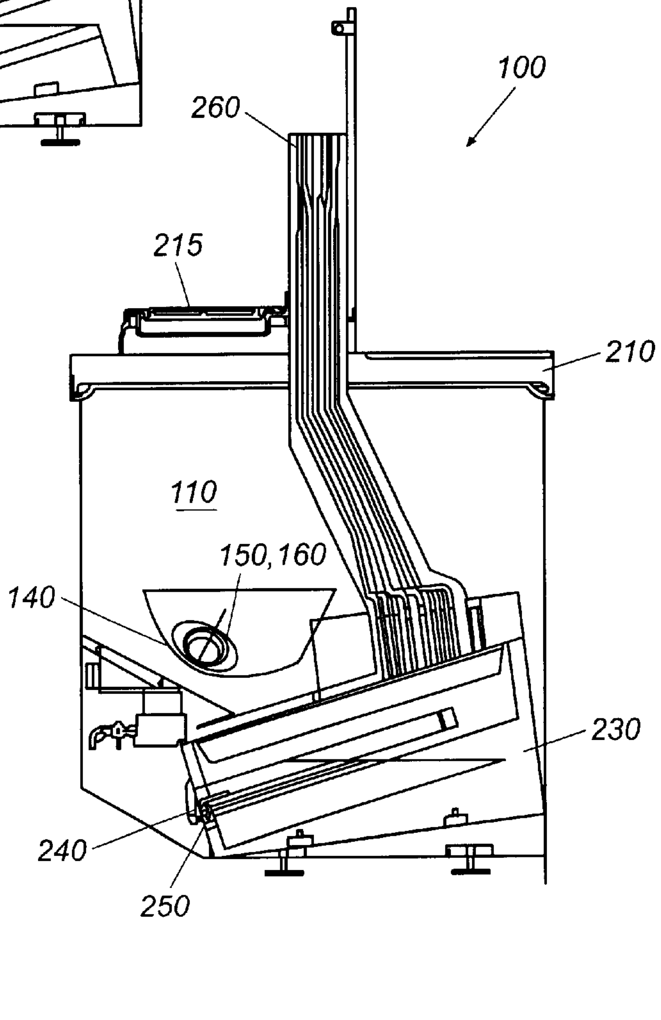
FIG. 5 is a side cross-sectional view of the ice hopper, the ice hopper side exit, and the risers.

As is shown in FIG. 7, the ice dispenser 480 may be attached to the ice tower 345 via an ice dispenser sleeve 500. The ice dispenser sleeve 500 may be a substantially circular element. The ice dispenser sleeve 500 may be fixedly attached to the top of the tower 345. An O-ring 502 may be used therebetween. The ice dispenser sleeve 500 may have a number of slots 505 formed therein. These slots 505 mesh with a number of bosses or prongs 510 positioned on the ice dispenser 480. The ice dispenser 480 may be placed on the ice tower 345 and then rotated into place within the ice dispenser sleeve 500 via the slots 505 and the prongs 510. Conversely, the ice dispenser 480 also may be easily removed by rotating the ice dispenser 480 in the opposite direction. The ice dispenser sleeve 500 may be made from any substantial rigid thermoplastic or similar types of materials.

Attached to the ice dispenser 480 may be an ice dispenser lever 520. The ice dispenser lever 520 may be in communication with the auger motor 340. When a consumer places a cup against the ice dispenser lever 520, the lever 520 activates the ice motor 340 such that the ice cubes are brought up through the ice elevator 300 and dispensed through the ice dispenser 480.

In use, ice cubes are added to the ice hopper 110 via the lid 220. The user generally opens the lid 220 and pours the ice cubes into the hopper 110. Alternatively, an ice making machine may continuously make ice so as to keep the ice hopper 110 filled. Once ice is present in the hopper 110, the agitator 170 continuously sweeps the ice cubes in the hopper 110 so as to prevent the ice cubes from solidifying. The agitator 170 also ensures that a steady supply of ice cubes is present adjacent to either the first side exit 150 or the second side exit 160. The ice cubes then proceed through one of the exits 150, 160 and fall out of the spigot 460 into the conduit 470 and the lower auger housing 350. When a consumer places a cup against the ice dispenser lever 520, the agitator motor 340 is activated and the ice cubes are carried up the ice auger 310 within the auger sleeve 390. The ice cubes are transported from the lower first end 320 of the auger 310 to the upper second end 330. Once the ice cubes reach the upper second end 330, the ice cubes pass through the ice dispenser 480 and down the ice chute 490 into the consumer's cup. The ice auger motor 340 is deactivated once the consumer removes the cup from the ice dispenser lever 520.

Any ice that is remaining within the ice tower 345 should remain chilled. The auger sleeve 390 uses the air space 420 for insulation. Likewise, the second air space 440 is positioned between the auger sleeve 390 and the outer housing 430. Further, any condensation that may form about the tower 345 should run down the exterior of the outer housing 430 and into the drip tray 215 positioned within the sub-base 210. By allowing the condensation to form on the outside of the outer housing 430, the condensation gives the ice elevator 300 a cold look that may be attractive to consumers.

The modular nature of the beverage dispenser system 100 of the present invention thus provides significant improvements in the art. For example, the beverage dispenser system 100 is more versatile in installation and retrofitting than known devices. Because the ice hopper 110 includes a first side exit 150 and a second side exit 160, the ice hopper 110 may be used with either left handed beverage systems or right handed beverage systems, i.e., the ice elevator 300 may be positioned on the left side of the beverage tower 200 or on the right side. Once a decision is made as to which side of the beverage tower 200 the ice elevator 300 should be positioned, the lower auger housing 350 of the ice tower 345 is fixedly attached to the base 360. The ice tower 345 is then attached to the desired exit 150, 160 of the ice hopper 110 via the spigot 460 and the conduit 470. The unused side exit 160, 170 is then capped by conventional means.

The entire beverage dispenser system 100 therefore can be interchangeable between right handed or left handed orientations, other than the sub-base 210, the risers 260, and the hopper lid 220. Although these elements generally are designed for one orientation or the other because of price constrains, even these elements may be designed in an interchangeable fashion. As such the beverage system 100 as a whole may be interchangeable between a right handed or a left handed ice elevator 300.

The beverage dispenser system 100 of the present invention also allows the ice elevator 300 to be retrofitted from one side of the beverage tower 200 to the other. In order to retrofit the unit as shown herein, the sub-base 210, the risers 260, and the lid 220 must be swapped out for an alternative sided element. The ice elevator 300, however, merely needs to be attached to the opposite exit 150, 160 of the ice hopper 110. Further, both side exits 150, 160 may be used at the same time if attached to two ice elevators 300. The agitators 170 may be used with any orientation of the ice elevators 300.

The beverage system 100 of the present invention also provides an ice elevator 300 that is substantially easier to clean than known devices. For example, the ice dispenser 480 is easily removed from the tower 345 via the ice dispenser sleeve 500. The user simply rotates the ice dispenser 480 within the ice dispenser sleeve 500 to remove it. Likewise, the outer housing 430 is easily removable to provide access to the auger sleeve 390. Similarly, the sliding auger sleeve 450 may slide up so as to permit access to the auger sleeve 390, the auger 310, and the lower auger housing 350. The conduit 470 is also removable. The lower auger housing 350 therefore may be accessed and cleaned via the main auger tube 370 or the supply tube 380. This ease of access also allows for quick replacement of components if any of the elements of the ice elevator 300 should be damaged.

It should be apparent that the foregoing relates only to the preferred embodiments of the present invention and that numerous changes and modifications may be made herein without departing from the spirit and scope of the invention as defined by the following claims.

We claim:

1. An ice elevator for use with a beverage dispenser system, said ice elevator comprising:

an ice auger;

an ice tower surrounding said ice auger;

said ice tower comprising an inner sleeve and an outer sleeve;

said ice tower comprising an outer housing surrounding said outer sleeve;

said outer housing comprising a sliding auger sleeve so as to permit access to said outer sleeve; and an ice dispenser positioned on top of said ice tower.

2. The ice elevator of claim 1, wherein said ice tower comprises an air space positioned between said inner sleeve and said outer sleeve.

3. The ice elevator of claim 1, wherein said ice tower comprises a second air space positioned between said outer sleeve and said outer housing.

4. The ice elevator of claim 1, wherein said ice tower comprises a transparent material.

5. The ice elevator of claim 1, wherein said ice dispenser comprises an ice chute.

6. The ice elevator of claim 1, wherein said ice dispenser comprises an ice dispenser lever so as to activate said ice elevator.

7. The ice elevator of claim 1, wherein said ice dispenser comprises a transparent material.

8. The ice elevator of claim 1, wherein said ice tower comprises an ice dispenser sleeve connecting said ice dispenser and said ice tower.

9. The ice elevator of claim 8, wherein said ice dispenser sleeve comprises a plurality of slots and wherein said ice dispenser comprises a plurality of bosses that mesh with said plurality of slots so as to secure said ice dispenser.

10. An ice elevator for providing ice for a beverage dispenser system, said ice elevator comprising:

an ice auger;

an ice tower surrounding said ice auger;

an ice dispenser positioned on top of said ice tower; and an ice dispenser sleeve fixedly attached to either of said ice tower or said ice dispenser such that said ice dispenser sleeve may rotatably attach to an other of said ice tower or said ice dispenser.

11. The ice elevator of claim 10, wherein said ice dispenser comprises a plurality of bosses thereon.

12. The ice elevator of claim 11, wherein said ice dispenser sleeve is fixedly attached to said ice tower and wherein said ice dispenser sleeve comprises a plurality of slots for engagement with said plurality of bosses of said ice dispenser.

13. The ice elevator of claim 10, wherein said ice tower comprises an inner sleeve and a detachable outer sleeve.

14. The ice elevator of claim 13, wherein said ice tower comprises an air space positioned between said inner sleeve and said detachable outer sleeve.

15. The ice elevator of claim 13, wherein said ice tower comprises a detachable outer housing surrounding said detachable outer sleeve.

16. The ice elevator of claim 15, wherein said ice tower comprises a second air space positioned between said detachable outer sleeve and said detachable outer housing.

* * * * *